United States Patent [19]
Johnson

[11] Patent Number: 4,761,040
[45] Date of Patent: Aug. 2, 1988

[54] WHEEL COVER MOUNTING SYSTEM FOR DUAL WHEELS

[76] Inventor: W. Gordon Johnson, 1339 Greenhills Rd., Greenfield, Ind. 46140

[21] Appl. No.: 938,793

[22] Filed: Dec. 8, 1986

[51] Int. Cl.$^4$ .............................................. B60B 7/00
[52] U.S. Cl. .............................. 301/37 S; 301/37 R; 301/37 SC; 301/108 S
[58] Field of Search .......... 301/37 R, 37 CM, 37 SS, 301/37 S, 37 SC, 108 R, 108 S, 108 SC, 36 R

[56] References Cited
U.S. PATENT DOCUMENTS

| | | | |
|---|---|---|---|
| 3,092,420 | 6/1963 | Baldwin et al. | 301/37 SC |
| 3,202,460 | 8/1965 | Holbrow | 301/37 |
| 3,367,722 | 2/1968 | Miyanaga | 301/37 R |
| 3,554,536 | 1/1971 | Richter | 301/108 |
| 3,653,719 | 4/1972 | Osawa et al. | 301/37 S |
| 4,217,002 | 8/1980 | Simpson | 301/37 CM |
| 4,261,621 | 4/1981 | Fox | 301/36 R |
| 4,396,232 | 8/1983 | Fox | 301/36 R |
| 4,462,639 | 7/1984 | Holmstrom | 301/37 SC |
| 4,473,258 | 9/1984 | Fox | 301/36 R |
| 4,576,415 | 3/1986 | Hempelmann | 301/37 S |
| 4,577,909 | 3/1986 | Browning | 301/37 TP |
| 4,632,465 | 12/1986 | Cummings | 301/108 S |

*Primary Examiner*—Robert B. Reeves
*Assistant Examiner*—Russell D. Stormer
*Attorney, Agent, or Firm*—Barnes & Thornburg

[57] ABSTRACT

A wheel cover mounting system for mounting a wheel cover on a wheel. The wheel includes a center with a concentric upstanding portion which projects outwardly therefrom along the wheel's axis and terminates at a generally radially extending surface. The generally radially extending surface includes a plurality of circumferentially spaced threaded holes. The upstanding portion of the wheel is provided with a cover including a plurality of holes capable of alignment with respective ones of the circumferentially spaced threaded holes. The mounting system includes a plurality of rods having inner ends and outer ends. The inner ends are threaded for threaded engagement into respective ones of the circumferentially spaced threaded holes. The inner ends of the rods pass through selected ones of the plurality of holes in the cover. Stop nuts are threaded onto the threaded inner ends of the rods. The cover is captured between the outer end of the upstanding portion and the stop nuts on the inner ends of the rods. The outer ends of the rods are threaded to receive stop nuts. A wheel cover mounting plate includes surfaces for engaging the stop nuts. The wheel cover mounting plate further includes a nut for engaging a bolt provided on the wheel cover to attach the wheel cover to the wheel.

7 Claims, 2 Drawing Sheets

WHEEL COVER MOUNTING SYSTEM FOR DUAL WHEELS

This invention relates to retaining systems for securing wheel covers to the wheels of wheeled vehicles such as automobiles, recreational vehicles, trucks and the like. It is disclosed in the context of attachment of wheel covers to dual wheels such as are usually found on the rear wheels of some heavier recreational vehicles and pickup trucks. However, the invention may be useful in other applications as well.

Dual wheels are characterized by greater depth from the plane of the rim to the region of the spider where the wheel is attached to the rear axle. This characteristic makes it quite difficult to secure a wheel cover to a dual wheel. The rims and wheel covers of the dual wheel are not configured so that the wheel cover can be snapped into engagement with the rim as is the case with most passenger car wheel covers.

The problem of attachment of a wheel cover to a dual wheel has not been well addressed in the prior art. The only commercially available unit known to applicant is one in which an attachment plate for direct attachment to the wheel cover is connected to the dual wheel by a plurality of legs, usually three or four. The legs are adjustable radially at adjustment points where they are secured to the attachment plate by bolts. The legs are adjustable axially to adapt the mechanism to different size and depth dual wheels by bolts at another point some distance down the legs from their attachment points to the attachment plate. Finally, the legs are attached to the dual wheel by feet which extend into selected hand holes in the dual wheel and are secured into these holes by bolts. Because this system requires three bolts for each of three or four legs, it is fairly difficult to adjust completely accurately when attaching it to the wheel. It also requires considerable attention to be sure that it remains in correct adjustment with all bolts tight.

The following U.S. Patents are also cited. Applicant does not intend by this citation to represent that a thorough search of all relevant prior art has been conducted or that no better prior art than that here discussed exists.

U.S. Pat. No. 3,202,460 shows a wheel cover attached by specially designed lug bolts to a wheel through an intermediate mounting plate.

U.S. Pat. Nos. 3,554,536 and 3,653,719 show wheel covers which are retained on wheels by lug bolts and lug nuts.

U.S. Pat. No. 4,217,002 shows a wheel cover mounting arrangement. A casing is mounted to the wheel by the lug nuts and bolts. Screws attach the wheel cover to the casing. A cap covers the screws.

U.S. Pat. No. 4,462,639 shows a wheel cover support pedestal which snaps into the center hole of a wheel and provides a threaded attachment point for a wheel cover.

U.S. Pat. No. 4,577,909 shows a wheel cover retention system wherein a center piece is attached to radially extending straps which engage in hand holes provided in a wheel. The wheel cover is then fastened by threaded attachment means to the center piece.

U.S. Pat. Nos. 4,261,621; 4,473,258; and 4,396,232 show various adapter kits for changing a single wheel mounting on a vehicle to a dual wheel mounting. In these kits, threaded stems are attached to the lug bolts.

It is an object of the present invention to provide an improved and simplified attachment mechanism for attaching a wheel cover to a wheel.

According to the invention, a wheel cover mounting system is provided for mounting a wheel cover on a wheel. The wheel includes a dished spider and a center with a concentric upstanding portion which projects outwardly therefrom along the wheel's axis and terminates at a generally radially extending surface. The generally radially extending surface includes a plurality of circumferentially spaced threaded holes. The mounting system includes a plurality of rods having inner and outer ends, the inner ends being threaded for threaded engagement into respective ones of the circumferentially spaced threaded holes. The outer ends of the rods include first engagement means. A wheel cover mounting plate includes complementary engagement means for engaging the first engagement means. The wheel cover mounting plate further includes third engagement means and the wheel cover includes complementary fourth engagement means for engaging the third engagement means.

According to an illustrative embodiment of the invention, the first engagement means comprises threads provided on the outer ends of the rods, means providing locking surfaces adjacent the threads on the outer ends of the rods, a plurality of holes in the wheel cover mounting plate, and nuts threadable on the threaded outer ends of the rods to capture the wheel cover mounting plate between the nuts and the locking surfaces. Illustratively, the means providing locking surfaces includes nuts threadable on the threaded outer ends of the rods.

Additionally, according to an illustrative embodiment, the third engagement means comprises means providing a threaded hole and means for fixing the position of the means providing the threaded hole relative to the wheel cover mounting plate. The complementary fourth engagement means comprises a bolt having threads engageable with the threads of the threaded hole and a head for capturing the wheel cover between the wheel cover mounting plate and the head.

Further according to an illustrative embodiment, the means for fixing the position of the means for providing a threaded hole comprises a snap-in resilient nut cage and means providing an opening in the wheel cover mounting plate for engaging the snap-in resilient nut cage, and the means for providing a threaded hole comprises a nut captured in the nut cage.

Additionally according to the invention, a cover is provided for the outer end of the upstanding portion, the cover including a plurality of holes capable of alignment with respective ones of the circumferentially spaced threaded holes, the inner ends of the rods pass through selected ones of the plurality of holes in the cover, and stop means are provided adjacent the threaded inner ends of the rods. The cover is captured between the outer end of the upstanding portion and the stop means adjacent the inner ends of the rods.

The invention may best be understood by referring to the following description and accompanying drawings which illustrate the invention. In the drawings.

Figure 1:
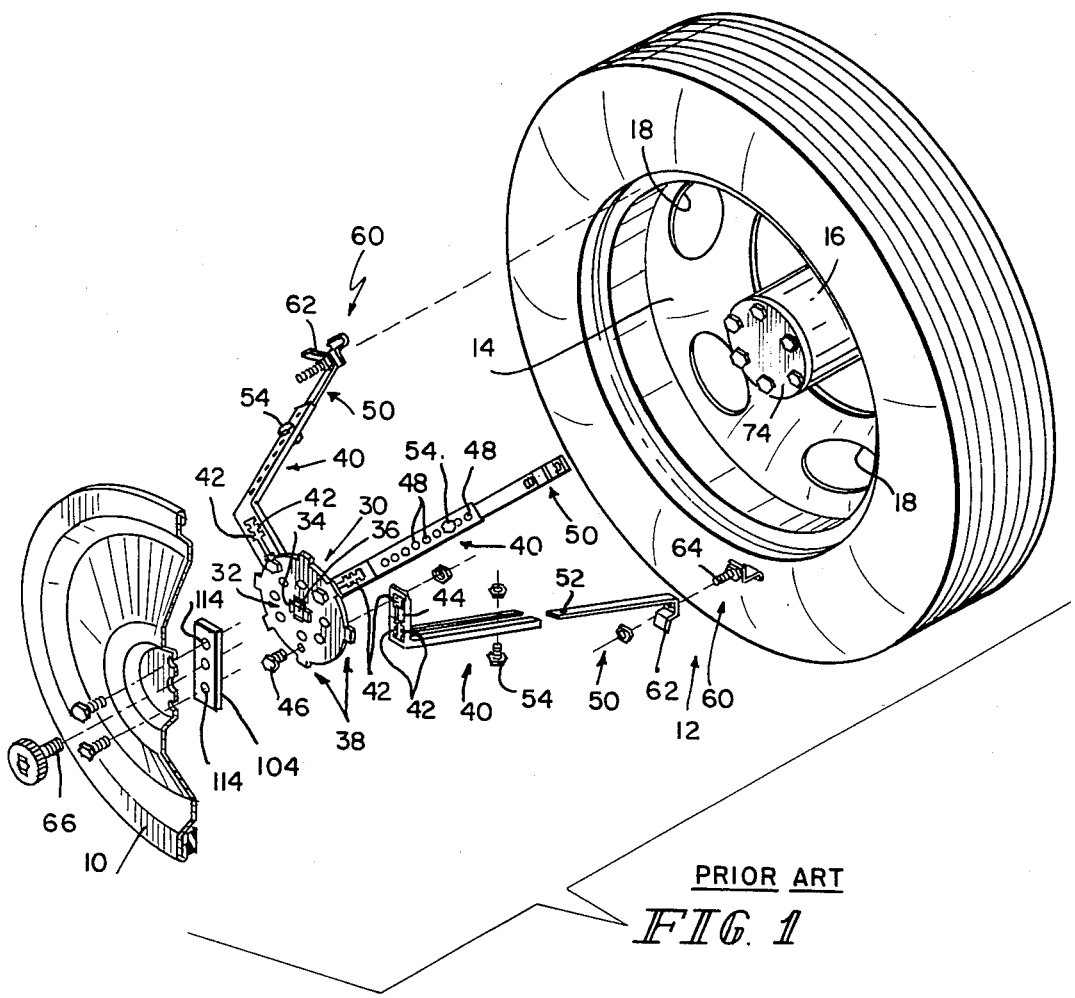
FIG. 1 illustrates a partly exploded perspective view of a commercially available prior art attachment mechanism for attaching a wheel cover to a dual vehicle wheel.

Referring now to FIG. 1, a prior art mechanism for attaching a wheel cover 10 to a dual wheel 12 is illustrated. The dual wheel 12 is generally characterized by a deeply dished face portion 14 which opens outwardly away from the vehicle. The rear axle of a vehicle equipped with dual wheels includes an axle end 16, hereinafter referred to as a center, through which the wheel 12 is attached to the vehicle. The dual wheel 12 itself also includes hand holes 18 stamped or otherwise formed in the dished face 14 of the wheel 12. The configuration of the center 16 can best be appreciated by referring to FIG. 3. Center 16 includes a flange 20 through which the wheel 12 is attached to it, an upstanding generally right circular cylindrical wall 22 which extends along the wheel 12 axis outward through a central circular opening 24 in the face 14 and terminates at a generally radially extending flat surface 26 within the interior defined by the dished face 14.

The prior art attachment mechanism 20 includes a wheel cover mounting plate 30 with a central generally rectangular opening 32 into which is press fitted a nut cage 34 housing a threaded nut 36. Six tabs 38, each having a radially outwardly extending portion and an axially inwardly extending portion, are provided around the circumference of the generally round plate 30. Four of the tabs are disposed substantially at equal 90° angles to each other. The remaining two tabs are disposed at about 35° or so in either direction from one of the equally spaced tabs. This arrangement permits attachment of axially outer leg portions 40 to the mounting plate 30 in numerous different orientations, the most common of which are four legs spaced at substantially equal 90° angles, and three legs, two spaced at approximately a 70° angle and the third leg substantially equiangularly spaced at approximately 145° from each of these.

Each leg portion 40 is provided with a plurality of transversely extending slots 42 joined by a longitudinally extending slot 44. The axially extending portions of the tabs fit through selected transversely extending slots 42 on the leg portions 40 and are secured thereto by bolts 46. It will be immediately appreciated that this attachment mechanism provides a source of misalignment. If different slots 42 on the respective leg portions 40 engage respective tabs 38, the mechanism 20 will be misaligned.

Each leg portion 40 is provided with a longitudinally extending plurality of uniformly spaced holes 48 adjacent its end remote from mounting plate 30. An axially inner leg portion 50 is provided for each axially outer leg portion 40. Each axially inner leg portion 50 is provided with a single hole 52 adjacent its axially outer end. Holes 52 are intended for alignment with respective ones of spaced holes 48 on respective outer leg portions 40. Bolts 54 secure respective leg portions 40, 50 in assembled configuration. It will be immediately appreciated that this gives rise to a second source of misalignment. If the same holes 48 are not used in the attachment of leg portions 40, 50, the mechanism 20 will be misaligned.

Each leg portion 50 is provided with a foot 60 at its axially inner end. Each foot 60 is shaped to engage a respective hand opening 18 in the dished portion 14. Each foot 60 is bolted to the lower end of a respective leg portion 50 by a bolt 64. Tightening of the nuts on bolts 64 clamps respective feet 60 into respective hand openings 18 against the spring force of the lower end 62 of a respective leg portion 50. Although every effort is made in the manufacture of a wheel 10 to shape and size the hand openings 18 uniformly, because there are slight differences in their shapes and sizes, and because they are not ideally shaped for the attachment mechanism to center the plate 30, some misalignment of the plate 30 from the center of the wheel is inevitable. The amount of misalignment is porportioned to the care with which the mechanism 20 is mounted on the wheel 12. These various sources may result in substantial cumulative alignment errors which will further increase the difficulty in attaching the wheel cover 10 which should be a simple task of inserting the screw 66 with which the wheel cover 10 is equipped into the threaded nut 36 and screwing it tight. Balance errors also attend these misalignment errors.

Figure 2:
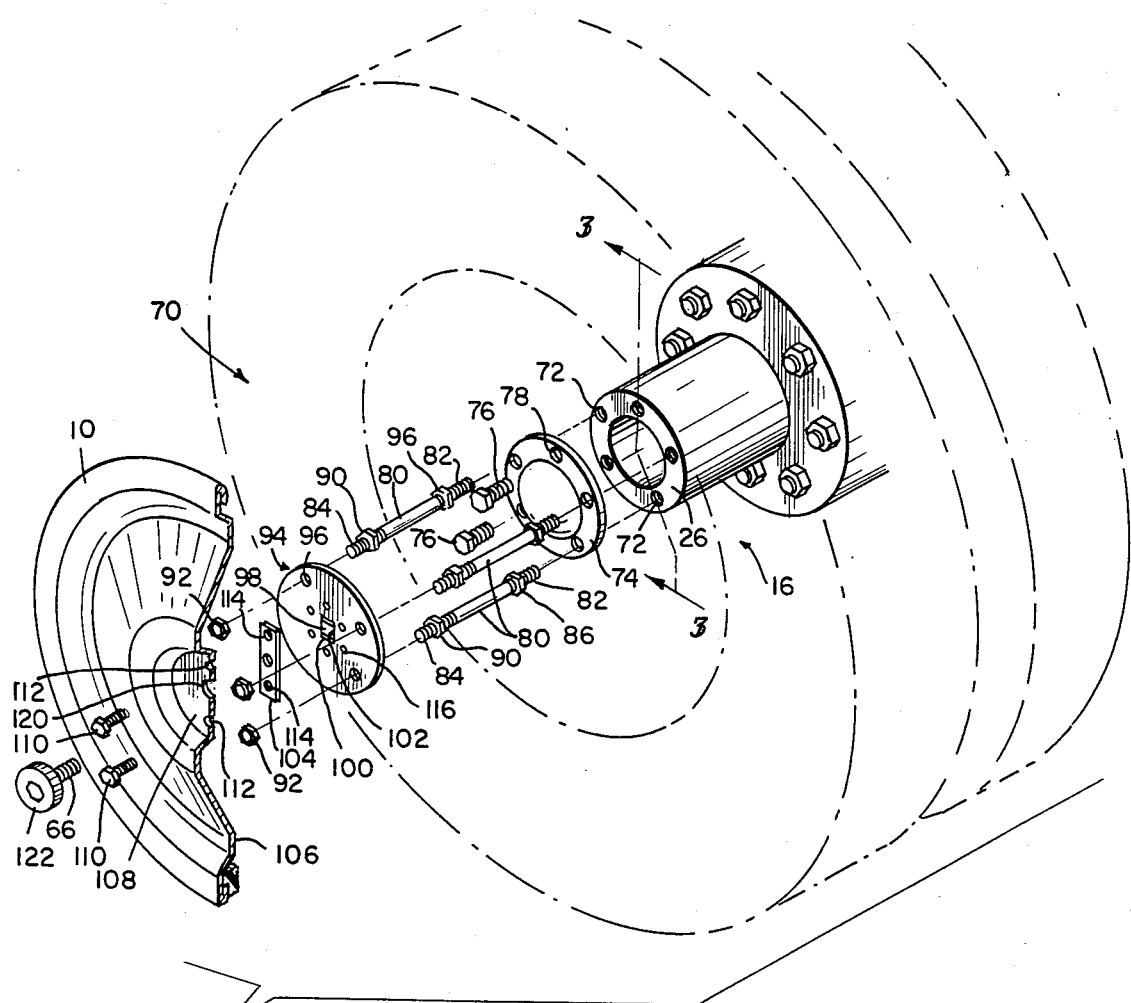
FIG. 2 illustrates a partly exploded perspective view of an attachment mechanism according to the present invention.
Figure 3:
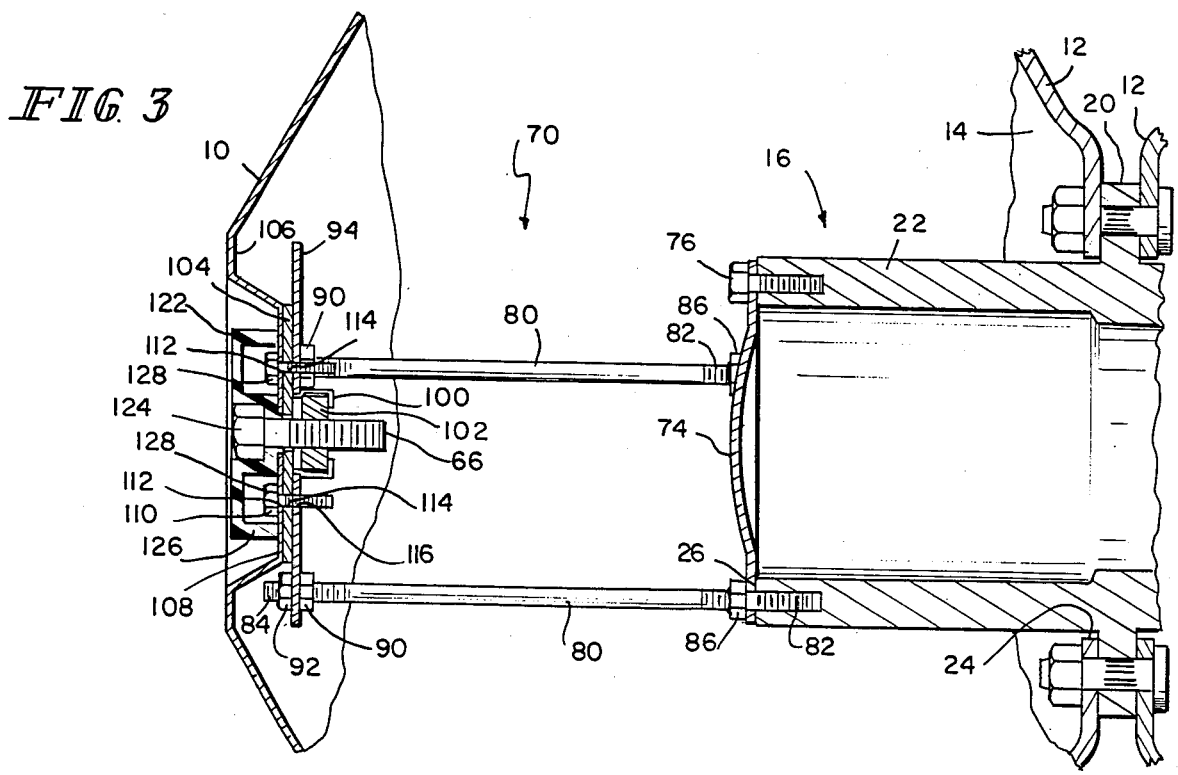
FIG. 3 illustrates a fragmentary sectional view of the attachment mechanism of FIG. 2 taken generally along section lines 3—3 of FIG. 2.

Turning now to FIGS. 2-3, the attachment mechanism 70 of the present invention reduces the number of different interconnected components, thereby reducing the potential for alignment errors. In addition, the attachment mechanism 70 of the invention employs parts of the wheel system which generally reduce the chance for misalignment to occur.

The radially extending surface 26 at the axially outer end of center 16 is ordinarily provided with a plurality of uniformly circumferentially spaced threaded holes 72 which extend axially inward into wall 22. A cover 74 with which the center 16 is equipped is attached by bolts 76 which project through holes 78 in cover 74 and are threaded into holes 72. The invention includes a plurality of rods 80, usually three or four whose lengths and diameters will depend upon the size and manufacture of the wheel 12 and center 16, onto which the mechanism 70 is to be mounted. Each rod 80 is threaded at its axially inner end 82 and at its axially outer end 84. Nuts 86 threaded onto the inner ends 82 of rods 80 provide stops against which rods 80 can be tightened when selected bolts 76 are removed from center 16 and replaced by rods 80. Nuts 86 can be welded to respective rods 80, if desired.

The axially outer ends 84 of rods 80 are provided with nuts 90 and 92. Nuts 90 provide stops. Nuts 92 capture a wheel cover mounting plate 94 between themselves and nuts 90 when ends 84 are inserted through holes 96 provided near the periphery of plate 94 and nuts 92 are tightened onto ends 84. Plate 94 is provided with a central somewhat rectangular opening 98 for engagement by a nut cage 100 to support a threaded nut 102 at substantially the center of plate 94.

A reinforcing plate 104 is attached to the back side 106 of the center 108 of wheel cover 10, illustratively by inserting two diametrically disposed bolts 110 through holes 112 provided therefor in wheel cover 10 and threading the bolts 110 through threaded holes 114 provided in reinforcing plate 104. A circular pattern of holes 116 of larger diameter than bolts 110 is provided through plate 94 to accommodate the axially inwardly projecting ends of bolts 110. The wheel cover 10 is attached to plate 94 by means of bolt 66 which extends through a central hole 120 provided in the wheel cover and into threaded engagement with nut 102. Bolt 66 is typically provided with a large molded resin head 122 which is molded to accommodate the head 124 of bolt 66 and includes a skirt 126 for covering the heads 128 of bolts 110.

What is claimed is:

1. A wheel cover mounting system for mounting a wheel cover on a wheel, the wheel including a center with a concentric upstanding portion which projects outwardly therefrom along the wheel's axis and terminates at a generally radially extending surface, the generally radially extending surface including a plurality of circumferentially spaced threaded holes, the mounting system including a plurality of rods having inner ends and outer ends, the inner ends being threaded for threaded engagement into respective ones of the circumferentially spaced threaded holes, the outer ends of the rods including first engagement means, a wheel cover mounting plate including complementary engagement means for engaging the first engagement means, the wheel cover mounting plate further including third engagement means and the wheel cover including complementary fourth engagement means for engaging the third engagement means, a cover for the outer end of the upstanding portion, the cover including a plurality of holes capable of alignment with respective ones of the circumferentially spaced threaded holes, the inner ends of the rods passing through selected ones of the plurality of holes in the cover, and stop means adjacent the threaded inner ends of the rods, the cover being captured between the outer end of the upstanding portion and the stop means adjacent the inner ends of the rods.

2. The apparatus of claim 1 wherein the first engagement means comprises threads provided on the outer ends of the rods, means providing locking surfaces adjacent the threads on the outer ends of the rods, a plurality of holes in the wheel cover mounting plate, and nuts threadable on the threaded outer ends of the rods to capture the wheel cover mounting plate between the nuts and the locking surfaces.

3. The apparatus of claim 2 wherein the means providing locking surfaces includes nuts threadable on the threaded outer ends of the rods.

4. The apparatus of claim 3 wherein the third engagement means comprises means providing a threaded hole and means for fixing the position of the means providing the threaded hole relative to the wheel cover mounting plate, and the complementary fourth engagment means comprises a bolt having threads engageable with the threads of the threaded hole and a head for capturing the wheel cover between the wheel cover mounting plate and the head.

5. The apparatus of claim 4 wherein the means for fixing the position of the means for providing a threaded hole comprises a snap-in resilient nut cage and means providing an opening in the wheel cover mounting plate for engaging the snap-in resilient nut cage, and the means for providing a threaded hole comprises a nut captured in the nut cage.

6. The apparatus of claim 1 wherein the third engagement means comprises means providing a threaded hole and means for fixing the position of the means providing the threaded hole relative to the wheel cover mounting plate, and the complementary fourth engagement means comprises a bolt having threads engageable with the threads of the threaded hole and a head for capturing the wheel cover between the wheel cover mounting plate and the head.

7. The apparatus of claim 6 wherein the means for fixing the position of the means for providing a threaded hole comprises a snap-in resilient nut cage and means providing an opening in the wheel cover mounting plate for engaging the snap-in resilient nut cage, and the means for providing a threaded hole comprises a nut captured in the nut cage.

* * * * *